United States Patent
Oswal et al.

(10) Patent No.: US 7,801,530 B2
(45) Date of Patent: Sep. 21, 2010

(54) CACHING CONTENT AT A CELL SITE

(75) Inventors: Anand K. Oswal, Santa Clara, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 686 days.

(21) Appl. No.: 11/117,581

(22) Filed: Apr. 27, 2005

(65) Prior Publication Data

US 2006/0246914 A1 Nov. 2, 2006

(51) Int. Cl.
*H04W 36/00* (2009.01)
*H04W 4/00* (2009.01)

(52) U.S. Cl. ............... 455/437; 455/442; 370/331

(58) Field of Classification Search .......... 455/403, 455/408, 411.2, 426.2, 414.2, 414.1, 436, 455/438, 441; 709/225, 203, 217, 218, 229; 370/332, 338
See application file for complete search history.

(56) References Cited

U.S. PATENT DOCUMENTS

| 6,434,396 | B1 | 8/2002 | Rune ................... 455/502 |
| 6,721,288 | B1 | 4/2004 | King et al. ............. 370/310 |
| 6,757,270 | B1 * | 6/2004 | Kumar et al. .......... 370/342 |
| 6,834,195 | B2 | 12/2004 | Brandenberg et al. ... 455/456.3 |
| 6,871,236 | B2 | 3/2005 | Fishman et al. ........ 709/246 |
| 6,941,338 | B1 * | 9/2005 | Madsen ................ 709/203 |
| 7,161,914 | B2 * | 1/2007 | Shoaib et al. .......... 370/331 |
| 7,436,796 | B2 * | 10/2008 | Takeuchi et al. ........ 370/328 |
| 7,480,274 | B2 * | 1/2009 | Shitama et al. ......... 370/331 |
| 2002/0172207 | A1 * | 11/2002 | Saito et al. ............ 370/400 |
| 2004/0047343 | A1 * | 3/2004 | Muniere ............... 370/352 |
| 2004/0053613 | A1 * | 3/2004 | Karaoguz et al. ....... 455/436 |

(Continued)

FOREIGN PATENT DOCUMENTS

JP 2005 020376 1/2005

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US2006/012778, dated Oct. 6, 2006, 11 pages.

State Intellectual Property Office of the People's Republic of China, Text of the First Office Action, Application No. 2006800067382, 19 total pages, English translation (9 pages), Chinese Office Action (10 pages), Mar. 26, 2010.

*Primary Examiner*—George Eng
*Assistant Examiner*—Christopher M Brandt
(74) *Attorney, Agent, or Firm*—Baker Botts L.L.P.

(57) ABSTRACT

Caching content includes receiving at a cell site a content request for content. The cell site is associated with a cell, and the content request is received from a mobile node present in the cell. The content is retrieved in response to the content request. The content is cached at the cell site and sent to the mobile node. One or more recipient cell sites are identified. The content is distributed to the one or more recipient cell sites while the mobile node is present in the cell.

21 Claims, 2 Drawing Sheets

U.S. PATENT DOCUMENTS

2006/0072509 A1* 4/2006 Lindoff et al. .............. 370/332
2006/0072532 A1* 4/2006 Dorenbosch et al. ........ 370/342
2004/0077350 A1* 4/2004 Naghian .................... 455/440
2005/0132049 A1* 6/2005 Inoue et al. ................. 709/225
2005/0143098 A1* 6/2005 Maillard .................. 455/456.5
2005/0282546 A1* 12/2005 Chang et al. ................ 455/436

* cited by examiner

CACHING CONTENT AT A CELL SITE

TECHNICAL FIELD

This invention relates generally to the field of communications and more specifically to caching content at a cell site.

BACKGROUND

A communication network may provide wireless services to mobile nodes present in the cells of the network. A cell typically includes a cell site that provides the services to the mobile nodes. As an example, a cell site may provide content from servers to the mobile nodes.

Known techniques for providing content involve caching the content at the cell site of a cell. The cached content is available to mobile nodes present in the cell. These techniques, however, are not efficient in certain situations. It is generally desirable to have efficient techniques in certain situations.

SUMMARY OF THE DISCLOSURE

In accordance with the present invention, disadvantages and problems associated with previous techniques for providing content to mobile nodes may be reduced or eliminated.

According to one embodiment of the present invention, caching content includes receiving at a cell site a content request for content. The cell site is associated with a cell, and the content request is received from a mobile node present in the cell. The content is retrieved in response to the content request. The content is cached at the cell site and sent to the mobile node. One or more recipient cell sites are identified. The content is distributed to the one or more recipient cell sites while the mobile node is present in the cell. According to one embodiment, the content may also be pre-loaded at the one or more recipient cell sites.

Certain embodiments of the invention may provide one or more technical advantages. A technical advantage of one embodiment may be that content may be cached at a cell site instead of at a server. The communication path between the cell site and the mobile node is typically shorter that the path between the server and the mobile node. Accordingly, caching content at the cell site instead of at the server may make the content more readily available to the mobile node.

Another technical advantage of one embodiment may be that the cell site of the cell in which a mobile node is present may distribute cached content to recipient cell sites of recipient cells. The content cached at a recipient cell site may be more readily available to the mobile node as the mobile node moves to the associated recipient cell. Yet another technical advantage of one embodiment may be that the cell site of the cell in which a mobile node is present may distribute the content to the recipient cells by multicasting the content.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
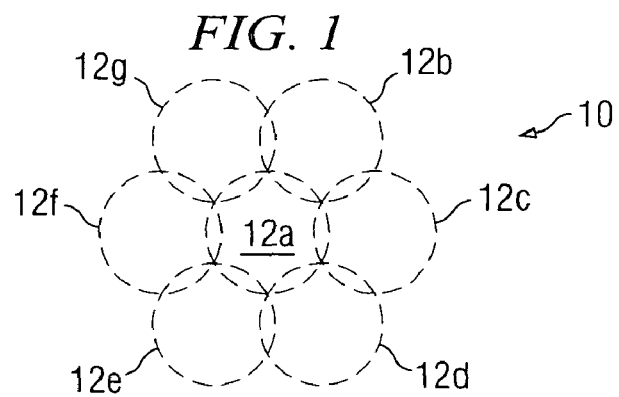
FIG. 1 is a diagram illustrating one embodiment of a neighborhood of cells at which content may be cached.

FIG. 1 is a diagram illustrating one embodiment of a neighborhood 10 of cells 12 at which content may be cached. According to the embodiment, a cell site of a cell 12a may cache content provided to a mobile node. The cell site may also provide the cached content to the cell sites of neighboring cells 12b-g. As an example, the cell site of cell 12a may multicast the cached content to the cell sites of neighboring cells 12b-g.

According to the illustrated embodiment, a cell 12 represents a geographic unit of a network attachment point of a communication network. As an example, cell 12 may represent a cell of a cellular network. As another example, cell 12 may represent a hot spot in a wireless network such as in an Institute of Electrical and Electronics Engineers, Inc. (IEEE) 802.11 Wi-Fi Alliance network or an IEEE 802.16 WiMAX Forum network. As yet another example, cell 12 may represent a geographic unit for a network of any suitable technology, for example digital subscriber line (DSL) or cable technology.

A cell 12 may have a cell identifier. A cell identifier may uniquely identify a cell 12, and may comprise any suitable identifier. A cell identifier of a cell 12 may comprise an address, for example, a medium access control (MAC) address or an IPvx such as IPv4 or IPv6 address, for an access point of the cell 12.

A neighbor cell 12b-g of a cell 12a may refer to a physical or logical neighbor of cell 12a. A physical neighbor cell 12b-g of cell 12a may refer to a cell 12b-g that is geographically proximate to cell 12a. As an example, a physical neighbor cell 12b-g may be adjacent to or overlapping with cell 12a. As another example, a physical neighbor cell 12b-g may be one, two, . . . , n hops away from cell 12a, where n represents any suitable number, for example, $1 \leq n \leq 10$, such as $2 \leq n \leq 5$.

A logical neighbor cell 12b-g of cell 12a may refer to a cell 12b-g with which cell 12a performs repeated hand-offs. As an example, different network attachment points for which repetitive hand-offs are performed may be considered logical neighbor cells 12b-g. Neighboring cells 12 may use different technologies. For example, cell 12a may use wireless technology, and cell 12b may use wired technology.

A cell 12 may have any suitable number of neighboring cells 12. According to the illustrated embodiment, cell 12a has six neighboring cells 12b-g. A cell 12, however, may have more or fewer neighboring cells 12. A cell 12 may have any suitable shape. According to the illustrated embodiment, cell 12a has a substantially circular shape that is formed into a substantially circular shape hexagonal shape by neighboring cells 12b-g. A cell 12, however, may have another suitable shape.

According to one embodiment, an active mobile node may be present in a cell 12*a* and communicate with the cell site of cell 12*a*. The mobile node may request content from the cell site. If the cell site does not have the content, the cell site may retrieve the content and then cache the content at the cell site.

The cell site may also distribute the content to cell sites of the neighboring cells 12*b*-*g*. According to one embodiment, the cell site may distribute the content by multicasting the content. The content may also be pre-loaded at the cell sites of the neighboring cells 12*b*-*g*. Pre-loading the content may refer to loading the content to memory of a cell site such that the content may be readily sent to the mobile node. Accordingly, if a mobile node moves to a neighboring cell 12*b*-*g*, the content may be readily available to the mobile node at the neighboring cell 12*b*-*g*.

The content may be distributed to and pre-loaded at any suitable set of recipient neighboring cells 12*b*-*g* determined in any suitable fashion. According to one embodiment, the set of recipient neighboring cells 12*b*-*g* may be predetermined. As an example, the set may include neighboring cells 12*b*-*g* that are n hops away from cell 12*a*. As another example, the set may include a subset of neighboring cells 12*b*-*g* that are adjacent to cell 12*a*.

According to another embodiment, the set of recipient neighboring cells 12*b*-*g* may be dynamically determined in response to a condition of the mobile node. A condition may refer to a condition that may be used to predict cells that the mobile node may visit. As an example, future cells 12 to be visited by a mobile node may be predicted based upon past cells 12 visited by the mobile node. For instance, a mobile node may be traveling in a vehicle. Based upon the path of cells 12 visited by the mobile node and the speed at which the mobile node is traveling, future cells 12 may be predicted.

According to another embodiment, the set of recipient neighboring cells 12*b*-*g* may be dynamically determined in accordance with messages sent from neighboring cells 12*b*-*g*. As an example, cell 12*a* may send a beacon message regarding the cached content to neighboring cells 12*b*-*g*. Neighboring cells 12*b*-*g* may indicate that they would like to receive the cached content by merely responding to the message or by sending a particular response to the message.

According to yet another embodiment, the set of recipient neighboring cells 12*b*-*g* may be dynamically determined in response to conditions at cell 12*a*. As an example, future cells 12 may be predicted based on historical data describing mobile nodes that have visited cell 12*a* in the past. The historical data may indicate that mobile nodes have a higher probability of visiting particular neighboring cells 12*b*-*g* after visiting cell 12*a*.

Content may be cached at cells 12 in any suitable manner. As an example, only a subset of the cell sites of cells 12 may receive the content. As another example, a cell site may share content cached at another cell site. As another example, a cell site may have content cached at more than one cache.

Figure 2:
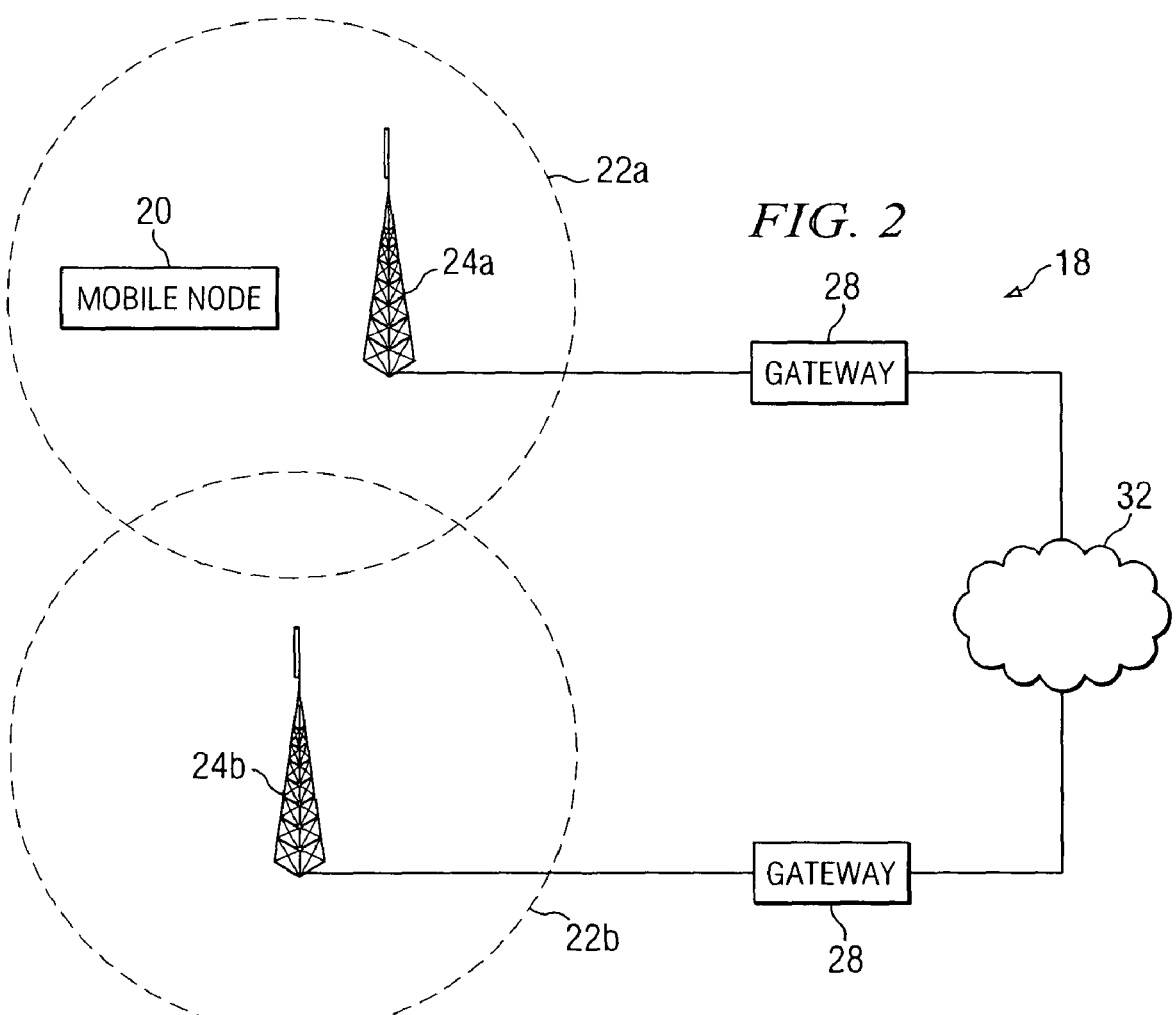
FIG. 2 is a block diagram illustrating one embodiment of a system that includes cell sites at which content may be cached.

FIG. 2 is a block diagram illustrating one embodiment of a system 18 that includes cell sites 24. A cell site 24*a* may cache content provided to a mobile node 20. A cell site 24*a* may also provide the cached content to another cell site 24*b*, so that the content may be more readily available to mobile node 20 as mobile node 20 moves to the other cell site 24*b*.

According to the illustrated embodiment, system 18 may operate to provide services such as communication sessions to endpoints such as mobile node 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 18 may utilize digital protocols and technologies to provide the communication sessions. Example digital protocols and technologies include those set by the Institute of Electrical and Electronics Engineers, Inc. (IEEE) 802.xx standards such as 802.11 and 802.16 standards, the Global System for Mobile communications (GSM) standards, the Internet Engineering Task Force (IETF) standards, or other standard. GSM standards may support technology such as general packet radio service (GPRS) technologies, and IETF standards may support code division multiple access (CDMA) technologies.

According to the illustrated embodiment, system 18 includes a mobile node 20, a plurality of cells 22, a plurality of cell sites 24, one or more gateways 28, and a network 32 coupled as shown. Mobile node 20 may represent any suitable logic comprising software, hardware, other logic, or any suitable combination of the preceding operable to communicate with a communication system. Mobile node 20 may comprise, for example, a personal digital assistant, a computer such as a laptop, a cellular telephone, a mobile handset, or any other device operable to communicate with system 18.

A cell 22 may be substantially similar to a cell 12 of FIG. 1, and may include a cell site 24 that provides services to mobile nodes 20 present in the cell 22. A mobile node 20 may be present in, or visiting, cell 22 if mobile node 20 is within the range of cell site 24 of cell 22. Cell site 24 operates as an access point to provide the wireless services. An access point may refer to a network point that couples a wireless network, such as a wireless radio network, to a wired network, such as a wired area network. Cell site 24 may represent a base station, an access point, a network attachment point, other device operable to provide wireless services, or any combination of the preceding.

Cell site 24 may facilitate a handover procedure by redirecting packets, such as traffic or control packets, in response to movement of mobile node 20. A handover procedure may refer to the process by which a communication session for mobile node 20 is passed from a previous cell site 24 to a current cell site 24 as mobile node 20 moves from a previous cell 22 to a current cell 22. A previous cell 22 refers to the cell 22 in which mobile node 20 is present prior to a handoff, and a current cell 22 refers to the cell 22 in which mobile node 20 is present after the handoff.

A cell site 24 of a cell 22 may comprise any suitable logic comprising software, hardware, other logic, or any suitable combination of the preceding operable to provide wireless services to mobile nodes 20 present in cell 22. According to one embodiment, cell site 24 includes a base transceiver station and a base station controller. The base transceiver station communicates signals to and from mobile node 20 through a wireless link that is typically a radio frequency link. The base station controller manages the operation of the base transceiver station.

According to one embodiment, a cell site 24 may include a cache manager. For example, the cache manager may be included in a cell site router of cell site 24. A cache manager may refer to an entity that retrieves content, caches the content, distributes the content to other cell sites, processes the content in another suitable manner, or any combination of the preceding. An example of a cache manager is described in more detail with reference to FIG. 3.

A gateway 28 allows mobile node 20 to communicate with network 32. A gateway 28 may represent any suitable logic comprising software, hardware, other logic, or any suitable combination of the preceding operable to interconnect with network 32. Gateway 28 may convert communications between different communication protocols. For example, gateway 28 may convert communications from a protocol to any of various other protocols that may be used by network 32, or vice-versa.

Network 32 comprises a communication network that allows mobile node 20 to communicate with other networks or devices. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Network 32 may include any suitable networks or devices that allow mobile node 20 to communicate with other networks or devices. As an example, network 32 may include an operator network comprising a communication network that is operated by a specific operator. An operator network may operate according to any suitable technology, such as wireless, cable, optical, other wireline or wireless technology, or any combination of the preceding.

As another example, network 32 may include a home network that includes a home agent and a foreign network that includes a foreign agent. A home agent of a mobile node may refer to an agent that maintains the address of the mobile node and forwards data to the mobile node. A foreign agent of a mobile node may refer to an agent that provides the home agent of the mobile node with an address to which data for the mobile node may be forwarded.

As yet another example, network 32 may include a server that provides content requested by mobile node 20. The server may provide other or additional functionality, such as a telephony or data service. A telephony service may refer to any suitable service provided during a communication session.

A component of system 18 may include an interface, logic, memory, other component, or any suitable combination of the preceding. "Interface" may refer to any suitable structure of a device operable to receive input for the device, send output from the device, perform suitable processing of the input or output or both, or any combination of the preceding, and may comprise one or more ports, conversion software, or both.

"Logic" may refer to hardware, software, other logic, or a combination of the preceding. Logic manages the operation of a device, and may comprise, for example, a processor. As used in this document, "processor" refers to any suitable device operable to execute instructions and manipulate data to perform operations.

"Memory" may refer to any structure operable to store and facilitate retrieval of information used by a processor, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 18 without departing from the scope of the invention. The components of system 18 may be integrated or separated according to particular needs. Moreover, the operations of system 18 may be performed by more, fewer, or other components. For example, the operations of cell site 24 and gateway 28 may be performed by one module, or the operations of cell site 24 may be performed by more than one module. Additionally, operations of system 18 may be performed using any suitable logic comprising software, hardware, other logic, or any suitable combination of the preceding. As used in this document, "each" refers to each member of a set or each member of a subset of a set.

Figure 3:
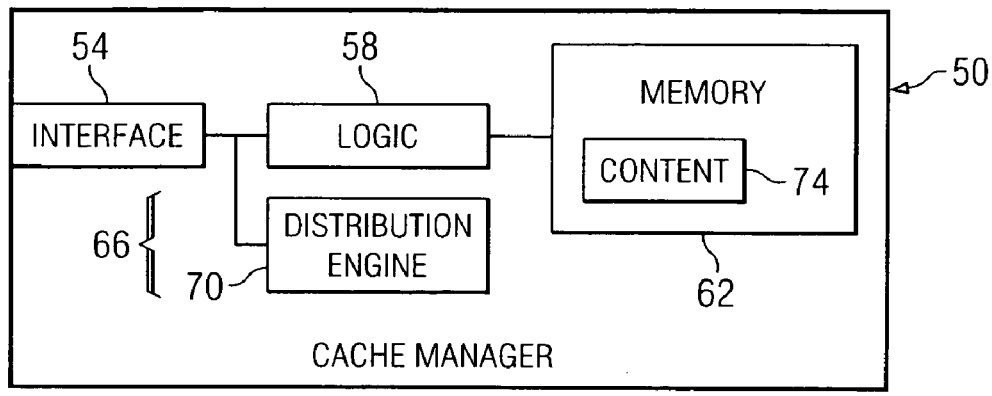
FIG. 3 is a block diagram illustrating one embodiment of a cache manager that may be used with the system of FIG. 2.

FIG. 3 is a block diagram illustrating one embodiment of a cache manager 50 that may be used with system 18 of FIG. 2. For purposes of illustration, cache manager 50 is assumed to be located at cell site 24a. According to the illustrated embodiment, cache manager 50 includes an interface (IF) 54, logic 58, a memory 62, and one or more applications 66 coupled as shown. Interface 54, logic 58, and memory 62 may be as described with reference to FIG. 2.

According to the illustrated embodiment, memory 62 stores cached content 74. Content 74 may refer to information requested by mobile node 20, and may be retrieved from a content server. Content 74 may include data, text, audio, video, multimedia, other suitable type of information, or any combination of the preceding.

Applications 66 may include software operable to retrieve and distribute content 74. According to the illustrated embodiment, applications 66 include a distribution engine 70. Distribution engine 70 distributes the cached content 74 to a set of neighboring cells 22. Distribution engine 70 may time stamp content 74 with the last retrieval time of content 74. The time stamp may allow other cell sites to determine if content 74 is current.

According to one embodiment, distribution engine 70 may distribute content 74 by multicasting content 74. Content 74 may be multicast by designating a set of neighboring cells 22 that are to receive multicast content 74. The set may be designated by placing the addresses for the cell sites 24 of the set of neighboring cells 22 in a multicast group. The set of neighboring cells may be determined in any suitable manner, for example, in a predetermined or dynamically determined manner as described previously. Distribution engine 70 may distribute content 74 according to any suitable method. An example method for distributing content 74 is described with reference to FIG. 4.

Modifications, additions, or omissions may be made to cache manager 50 without departing from the scope of the invention. The components of cache manager 50 may be integrated or separated according to particular needs. Moreover, the operations of cache manager 50 may be performed by more, fewer, or other modules. Additionally, operations of cache manager 50 may be performed using any suitable logic comprising software, hardware, other logic, or any suitable combination of the preceding.

Figure 4:
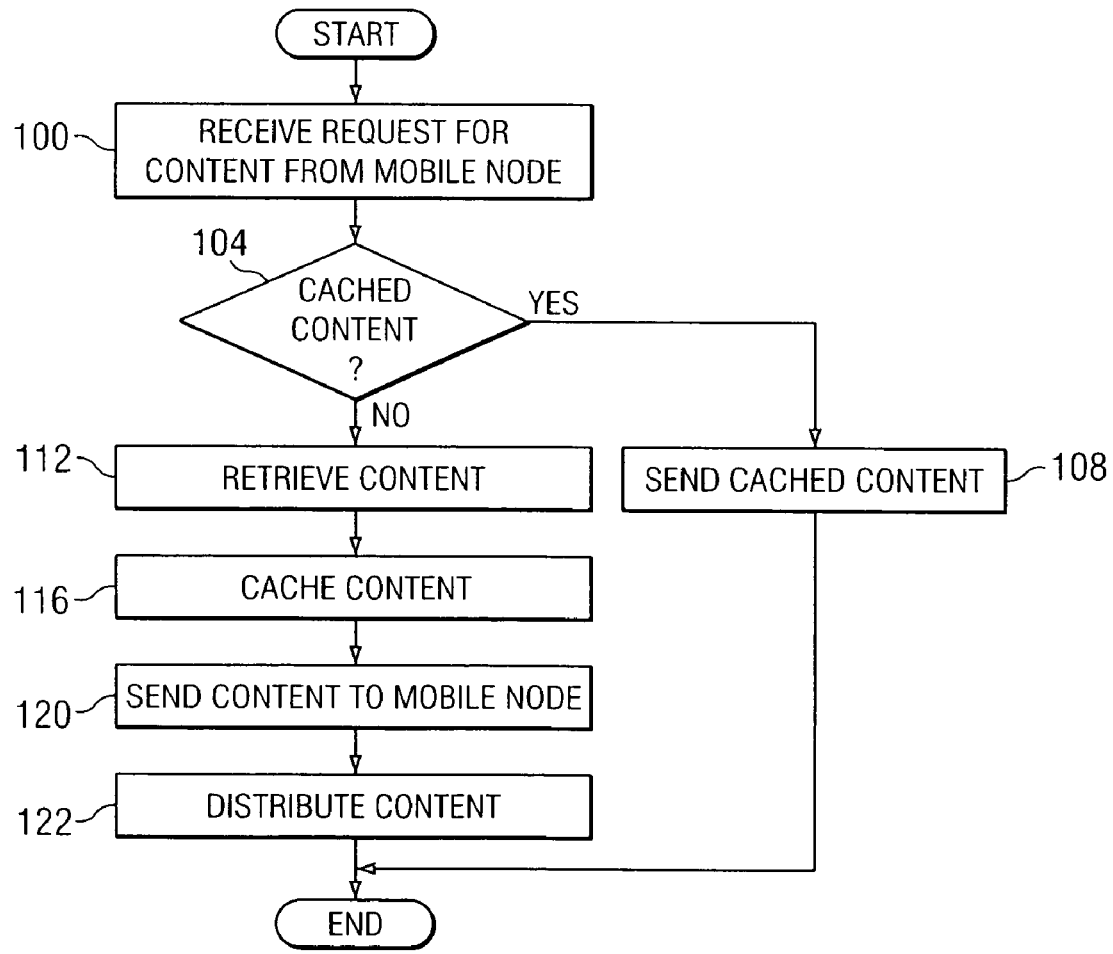
FIG. 4 is a flowchart illustrating one embodiment of a method operable to provide cached content to cell sites that may be used with the system of FIG. 2.

FIG. 4 is a flowchart illustrating one embodiment of a method operable to provide cached content to cell sites may be used with the system of FIG. 2. The method begins at step 100, where cell site 24a receives a content request from mobile node 20. A content request may refer to a message that requests content. Cell site 24a determines whether the requested content is cached at cell site 24a at step 104. The content may be cached by cache manager 50 in memory 62. Cell site 24a may also determine whether the cached content is current. If the content is current and cached at step 104, the method proceeds to step 108, where cell site 24a sends the cached content 74 to mobile node 20. The method then terminates.

If the content is not cached at step 104, cell site 24a retrieves the content at step 112. Cache manager 50 of cell site 24a may be used to retrieve the content from a server located at network 32. Cell site 24a caches the content at step 116. Cache manager 50 may cache the content in memory 62 to create cached content 74.

Cell site 24a sends the cached content to mobile node 20 at step 120. The content is distributed to and pre-loaded at the set of neighbor cells 24 at step 122. Cache manager 50 may distribute content 74 to the set of neighbor cells 22 by multicasting content 74. After distributing the content, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that content may be cached at a cell site instead of at a server. The communication path between the cell site and the mobile node is typically shorter that the path between the server and the mobile node. Accordingly, caching content at the cell site instead of at the server may make the content more readily available to the mobile node.

Another technical advantage of one embodiment may be that the cell site of the cell in which a mobile node is present may distribute cached content to recipient cell sites of recipient cells. The content cached at a recipient cell site may be more readily available to the mobile node as the mobile node moves to the associated recipient cell. Yet another technical advantage of one embodiment may be that the cell site of the cell in which a mobile node is present may distribute the content to the recipient cells by multicasting the content.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for caching content, comprising:
   receiving at a cell site a content request for content, the cell site being a base station located in a cell, the content request received from a mobile node present in the cell;
   retrieving the content in response to the content request;
   caching the content at the cell site;
   sending the content to the mobile node;
   assessing historical data describing a plurality of past mobile nodes that had visited the cell in the past;
   determining that the historical data indicates that the past mobile nodes have a higher probability of visiting a plurality of neighboring cells after visiting the cell, the neighboring cells neighboring and distinct from the cell;
   dynamically selecting a plurality of neighboring cell sites of the neighboring cells as a plurality of recipient cell sites selected according to the historical data, a neighboring cell site being a neighboring base station located in a neighboring cell; and
   distributing the content from the cell site to the plurality of recipient cell sites selected according to the historical data while the mobile node is present in the cell prior to moving to a next cell and prior to identifying the next cell and initiating handover from the cell to the next cell.

2. The method of claim 1, wherein distributing the content to the one or more recipient cell sites further comprises:
   establishing a multicast group of one or more addresses, an address of the one or more addresses corresponding to a recipient cell site of the one or more recipient cell sites; and
   multicasting the content to the multicast group.

3. The method of claim 1, wherein dynamically selecting the neighboring cell sites further comprises:
   assessing a condition of the mobile node; and
   identifying the one or more recipient cell sites in accordance with the assessed condition of the mobile node.

4. The method of claim 1, wherein dynamically selecting the neighboring cell sites further comprises:
   sending a message regarding the content to a plurality of neighboring cells;
   receiving one or more responses from neighboring cells; and
   identifying the one or more recipient cell sites in accordance with the one or more responses.

5. The method of claim 1, wherein each recipient cell site of the one or more recipient cell sites is operable to pre-load the content.

6. The method of claim 1, wherein dynamically selecting the neighboring cell sites further comprises:
   establishing a plurality of cell sites comprising a first cell site and the one or more recipient cell sites; and
   selecting the one or more recipient cell sites, a recipient cell site of the one or more recipient cell sites operable to share the content with the first cell site.

7. A cell site being a base station located in a cell, the cell site comprising:
   an interface operable to:
      receive a content request for content, the content request received from a mobile node present in the cell; and
   a cache manager coupled to the interface and operable to:
      retrieve the content in response to the content request;
      cache the content at the cell site;
      send the content to the mobile node;
      assess historical data describing a plurality of past mobile nodes that had visited the cell in the past;
      determine that the historical data indicates that the past mobile nodes have a higher probability of visiting a plurality of neighboring cells after visiting the cell, the neighboring cells neighboring and distinct from the cell;
      dynamically select a plurality of neighboring cell sites of the neighboring cells as a plurality of recipient cell sites selected according to the historical data, a neighboring cell site being a neighboring base station located in a neighboring cell; and
      distribute the content from the cell site to the plurality of recipient cell sites selected according to the historical data while the mobile node is present in the cell prior to moving to a next cell and prior to identifying the next cell and initiating handover from the cell to the next cell.

8. The cell site of claim 7, wherein the cache manager is further operable to distribute the content to the one or more recipient cell sites by:
   establishing a multicast group of one or more addresses, an address of the one or more addresses corresponding to a recipient cell site of the one or more recipient cell sites; and
   multicasting the content to the multicast group.

9. The cell site of claim 7, wherein the cache manager is further operable to dynamically select the one or more neighboring cell sites by:
   assessing a condition of the mobile node; and
   identifying the one or more recipient cell sites in accordance with the assessed condition of the mobile node.

10. The cell site of claim 7, wherein the cache manager is further operable to dynamically select the one or more neighboring cell sites by:
   sending a message regarding the content to a plurality of neighboring cells;
   receiving one or more responses from one or more neighboring cells; and
   identifying the one or more recipient cell sites in accordance with the one or more responses.

11. The cell site of claim 7, wherein each recipient cell site of the one or more recipient cell sites is operable to pre-load the content.

12. The cell site of claim 7, wherein the cache manager is further operable to dynamically select the one or more neighboring cell sites by:
   establishing a plurality of cell sites comprising a first cell site and the one or more recipient cell sites; and
   selecting the one or more recipient cell sites, a recipient cell site of the one or more recipient cell sites operable to share the content with the first cell site.

13. A cell site being a base station located in a cell, the cell site comprising:
   an interface operable to:
      receive a content request for content, the content request received from a mobile node present in the cell; and
   a cache manager coupled to the interface and operable to:
      retrieve the content in response to the content request;
      cache the content at the cell site;
      send the content to the mobile node;
      identify a plurality of recipient cell sites, a recipient cell site being a recipient base station located in a recipient cell; and
      distribute the content to the plurality of recipient cell sites while the mobile node is present in the cell and prior to moving to a next cell and prior to identifying the next cell and initiating handover from the cell to the next cell, the content distributed by:
         establishing a multicast group of one or more addresses, an address of the one or more addresses corresponding to a recipient cell site of the one or more recipient cell sites; and
         multicasting the content to the multicast group, each recipient cell site of the one or more recipient cell sites operable to pre-load the content; and
   the cache manager further operable to identify the one or more recipient cell sites by:
      identifying a plurality of cell sites of a plurality of predetermined neighboring cells;
      assessing a condition of the mobile node;
      identifying the one or more recipient cell sites in accordance with the assessed condition of the mobile node;
      sending a message regarding the content to a plurality of neighboring cells;
      receiving one or more responses from one or more neighboring cells;
      identifying the one or more recipient cell sites in accordance with the one or more responses;
      establishing a plurality of cell sites comprising a first cell site and the one or more recipient cell sites; and
      selecting the one or more recipient cell sites, a recipient cell site of the one or more recipient cell sites operable to share the content with the first cell site.

14. A system for caching content, comprising:
   means for receiving at a cell site a content request for content, the cell site being a base station located in a cell, the content request received from a mobile node present in the cell;
   means for retrieving the content in response to the content request;
   means for caching the content at the cell site;
   means for sending the content to the mobile node;
   means for assessing historical data describing a plurality of past mobile nodes that had visited the cell in the past;
   means for determining that the historical data indicates that the past mobile nodes have a higher probability of visiting a plurality of neighboring cells after visiting the cell, the neighboring cells neighboring and distinct from the cell;
   means for dynamically selecting a plurality of neighboring cell sites of the neighboring cells as a plurality of recipient cell sites selected according to the historical data, a neighboring cell site being a neighboring base station located in a neighboring cell; and
   means for distributing the content from the cell site to the plurality of recipient cell sites selected according to the historical data while the mobile node is present in the cell prior to moving to a next cell and prior to identifying the next cell and initiating handover from the cell to the next cell.

15. A network operable to cache content, comprising:
   a first cell site being a first base station located in a first cell; and
   a plurality of recipient cell sites, a recipient cell site associated with a recipient cell;
   the first cell site operable to:
      receive a content request for content, the content request received from a mobile node present in the first cell;
      retrieve the content in response to the content request;
      cache the content at the cell site;
      send the content to the mobile node;
      assess historical data describing a plurality of past mobile nodes that had visited the cell in the past;
      determine that the historical data indicates that the past mobile nodes have a higher probability of visiting a plurality of neighboring cells after visiting the cell, the neighboring cells neighboring and distinct from the cell;
      dynamically select a plurality of one or more neighboring cell sites of the neighboring cells as the plurality of recipient cell sites selected according to the historical data, a neighboring cell site being a neighboring base station located in a neighboring cell; and
      distribute the content to the plurality of recipient cell sites selected according to the historical data while the mobile node is present in the first cell prior to moving to a next cell and prior to identifying the next cell and initiating handover from the cell to the next cell.

16. The network of claim 15, wherein the first cell site is further operable to distribute the content to the one or more recipient cell sites by:
   establishing a multicast group of one or more addresses, an address of the one or more addresses corresponding to a recipient cell site of the one or more recipient cell sites; and
   multicasting the content to the multicast group.

17. The network of claim 15, wherein the first cell site is further operable to dynamically select the one or more neighboring cell sites by:
  assessing a condition of the mobile node; and
  identifying the one or more recipient cell sites in accordance with the assessed condition of the mobile node.

18. The network of claim 15, wherein the first cell site is further operable to dynamically select the one or more neighboring cell sites by:
  sending a message regarding the content to a plurality of neighboring cells;
  receiving one or more responses from one or more neighboring cells; and
  identifying the one or more recipient cell sites in accordance with the one or more responses.

19. The network of claim 15, wherein each recipient cell site of the one or more recipient cell sites is operable to pre-load the content.

20. The network of claim 15, wherein the first cell site is further operable to dynamically select the one or more neighboring cell sites by:
  establishing a plurality of cell sites comprising a first cell site and the one or more recipient cell sites; and
  selecting the one or more recipient cell sites, a recipient cell site of the one or more recipient cell sites operable to share the content with the first cell site.

21. A network operable to cache content, comprising:
  a first cell site being a first base station located in a first cell; and
  a plurality of recipient cell sites, a recipient cell site being a recipient base station located in a recipient cell;
  the first cell site operable to:
    receive a content request for content, the content request received from a mobile node present in the first cell;
    retrieve the content in response to the content request;
    cache the content at the cell site;
    send the content to the mobile node;
    distribute the content to the plurality of recipient cell sites while the mobile node is present in the first cell and prior to moving to a next cell and prior to identifying the next cell and initiating handover from the cell to the next cell, the content distributed by:
      establishing a multicast group of one or more addresses, an address of the one or more addresses corresponding to a recipient cell site of the one or more recipient cell sites; and
      multicasting the content to the multicast group, each recipient cell site of the one or more recipient cell sites operable to pre-load the content; and
    identify the one or more recipient cell sites by:
      identifying a plurality of cell sites of a plurality of predetermined neighboring cells;
      assessing a condition of the mobile node;
      identifying the one or more recipient cell sites in accordance with the assessed condition of the mobile node;
      sending a message regarding the content to a plurality of neighboring cells;
      receiving one or more responses from one or more neighboring cells;
      identifying the one or more recipient cell sites in accordance with the one or more responses;
      establishing a plurality of cell sites comprising a first cell site and the one or more recipient cell sites; and
      selecting the one or more recipient cell sites, a recipient cell site of the one or more recipient cell sites operable to share the content with the first cell site.

* * * * *